United States Patent
Kim

(10) Patent No.: US 9,657,802 B2
(45) Date of Patent: May 23, 2017

(54) ELECTRONICALLY CONTROLLED INTERNAL DAMPER

(71) Applicant: MANDO CORPORATION, Pyeongtaek-si, Gyeonggi-do (KR)

(72) Inventor: Eun Joong Kim, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/011,214

(22) Filed: Jan. 29, 2016

(65) Prior Publication Data
US 2016/0221411 A1     Aug. 4, 2016

(30) Foreign Application Priority Data
Feb. 2, 2015   (KR) .................. 10-2015-0016155

(51) Int. Cl.
*B60G 17/08*     (2006.01)
*F16F 9/48*      (2006.01)

(52) U.S. Cl.
CPC .................................... *F16F 9/48* (2013.01)

(58) Field of Classification Search
CPC .... B60G 17/08; B60G 13/08; B60G 2202/24; B60G 2206/41; B60G 2500/10; F16F 9/48; F16F 9/512; F16F 9/5126
See application file for complete search history.

(56) References Cited

U.S. PATENT DOCUMENTS

| 5,975,258 | A | * | 11/1999 | Nezu ..................... F16F 9/348 188/266.5 |
| 6,371,262 | B1 | * | 4/2002 | Katou ..................... F16F 9/465 188/266.5 |
| 2003/0132073 | A1 | * | 7/2003 | Nakadate ............... F16F 9/3214 188/282.2 |

* cited by examiner

*Primary Examiner* — Vishal Sahni
(74) *Attorney, Agent, or Firm* — McDermott Will & Emery LLP

(57) ABSTRACT

An electronically controlled internal damper is provided. Due to a structure in which a valve unit is mounted on a spool rod along which a driven spool reciprocates and a damping unit is provided in an outer peripheral surface of the driven spool and the spool rod, it is possible to improve ride comfort by reducing a low-speed damping force of a soft mode in the driven spool and the spool rod without increasing their sizes.

6 Claims, 4 Drawing Sheets

ELECTRONICALLY CONTROLLED INTERNAL DAMPER

CROSS-REFERENCE(S) TO RELATED APPLICATION

This application claims priority of Korean Patent Application No. 10-2015-0016155, filed on Feb. 2, 2015, in the Korean Intellectual Property Office, which is hereby incorporated by reference in its entirety.

BACKGROUND OF THE INVENTION

Field of the Invention

The present invention relates to an electronically controlled internal damper, and more particularly, to an electronically controlled internal damper that is capable of improving ride comfort by reducing a low-speed damping force of a soft mode without increasing the sizes of a driven spool and a spool rod.

Description of the Related Art

In most of the conventional electronically controlled internal dampers, a bypass passage is disposed only on a rebound side.

In such electronically controlled internal dampers, since a passage area of a cylinder increases, it is difficult to reduce a low-speed damping force of a soft mode during a rebound stroke.

In order to solve this problem, it may be considered that an outer diameter of a spool is increased so as to open a passage in a divided manner. However, such a design modification causes an increase in a whole valve size or a reduction in a disk size, thus producing adverse effect in a medium-speed or high-speed section.

CITATION LIST

Patent Literature (Patent Literature 1) Korean Patent Registration No. 10-0854598
(Patent Literature 2) Japanese Patent Application Laid-Open No. H7-332425

SUMMARY OF THE INVENTION

The present invention has been made in an effort to solve the above problems, and is directed to provide an electronically controlled internal damper that is capable of improving ride comfort by reducing a low-speed damping force of a soft mode in a driven spool and a spool rod having the same size.

According to an embodiment of the present invention, an electronically controlled internal damper includes: a spool rod which is formed to have a stepped shape in a lower end portion of a piston rod that reciprocates within a cylinder; a valve unit including: a main piston which has a central portion through which the spool rod passes, and partitions the cylinder into a cylinder upper chamber and a cylinder lower chamber, and in which a compression passage and a rebound passage are alternately disposed; a compression retainer disposed above the main piston; a rebound retainer disposed under the main piston; a first housing which is disposed above the compression retainer to form a first pilot chamber thereinside and has an opened bottom surface; and a second housing which is disposed under the rebound retainer to form a second pilot chamber thereinside and has an opened top surface; a driven spool which reciprocates along a guide passage penetrating a central portion of the spool rod; and a damping unit which is provided on an outer peripheral surface of the driven spool and the spool rod so as to allow a working fluid to flow to the inside and outside of the driven spool through the guide passage during a compression stroke or a rebound stroke, forms a bypass passage in an upper portion thereof during the compression stroke in a hard mode or a soft mode, and forms a bypass passage in a lower portion thereof during the rebound stroke in the hard mode or the soft mod.

The bypass passage formed between the spool rod and the driven spool during the compression stroke or the rebound stroke in the soft mode may be provided between the bypass passages formed between the spool rod and the driven spool during the compression stroke or the rebound stroke in the hard mode.

The bypass passage formed between the spool rod and the driven spool during the compression stroke in the hard mode may be provided above the bypass passage formed between the spool rod and the driven spool during the compression stroke in the soft mode.

The bypass passage formed between the spool rod and the driven spool during the rebound stroke in the soft mode may be provided above the bypass passage formed between the spool rod and the driven spool during the rebound stroke in the hard mode.

The damping unit may include: a communication assembly which is provided in the spool rod such that the first pilot chamber of the first housing, the compression retainer, the main piston, the rebound retainer, and the second pilot chamber of the second housing from the upper side communicate with the guide passage; and a guide assembly which is provided along an outer peripheral surface of the driven spool and allows a flow of the working fluid from the upper and lower sides of the driven spool through the communication assembly according to the compression stroke or the rebound stroke in the hard mode or the soft mode.

DETAILED DESCRIPTION OF EXEMPLARY EMBODIMENTS

Figure 1:
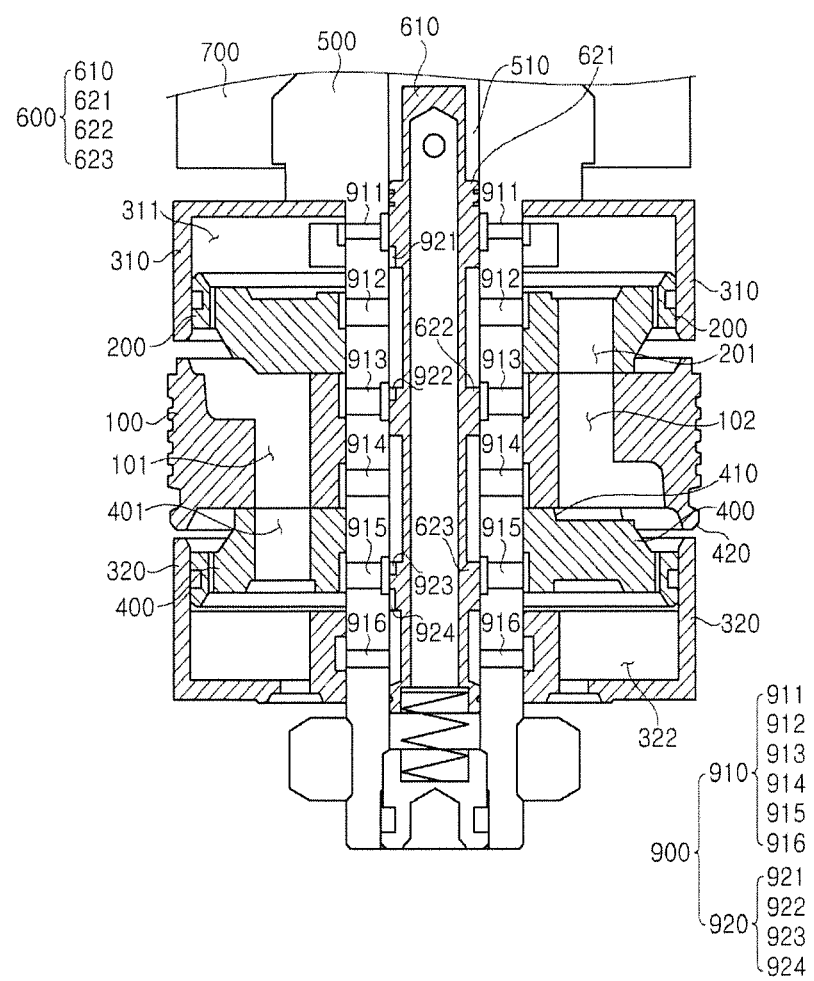
FIG. 1 is a cross-sectional conceptual diagram illustrating an overall configuration of an electronically controlled internal damper according to an embodiment of the present invention.

The advantages and features of the present invention and methods for achieving them will become more apparent from the following embodiments that are described in detail in conjunction with the accompanying drawings.

However, the present invention is not limited to the following embodiments, but may be embodied in various forms.

These embodiments are provided so that this disclosure will be thorough and complete, and will fully convey the scope of the invention to those skilled in the art.

The scope of the present invention is defined by the appended claims.

Therefore, in some embodiments, detailed descriptions of well-known elements, operations, and technologies will be omitted for simplicity and clarity.

Throughout the disclosure, like reference numerals refer to like elements. The terminology used herein is intended to just describe particular embodiments and is not intended to limit the present invention.

In this specification, the singular forms "a", "an", and "the" are intended to include the plural forms as well, unless the context clearly indicates otherwise. It will be understood that terms such as "comprise", "include", and "have", when used herein, specify the presence of stated elements and operations, but do not preclude the presence or addition of one or more other elements and operations.

Unless defined otherwise, all terms including technical and scientific terms will be used herein so as to have the same meaning as commonly understood by one of ordinary skill in the art to which the present invention belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Now, preferred embodiments of the present invention will be described with reference to the accompanying drawings.

Figure 2:
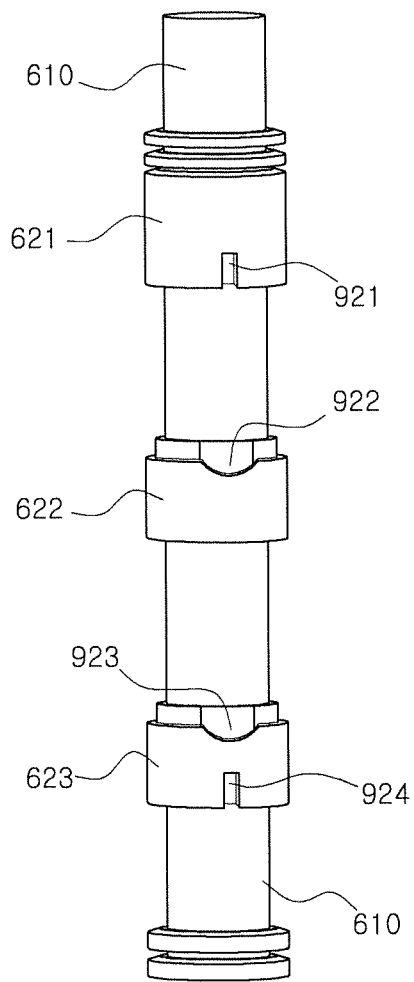
FIG. 2 is a perspective view illustrating a structure of a guide assembly formed in a driven spool of a damping unit that is a main part of the electronically controlled internal damper according to the embodiment of the present invention.

FIG. 1 is a cross-sectional conceptual diagram illustrating an overall configuration of an electronically controlled internal damper according to an embodiment of the present invention, and FIG. 2 is a perspective view illustrating a structure of a guide assembly formed in a driven spool of a damping unit that is a main part of the electronically controlled internal damper according to the embodiment of the present invention.

As illustrated, a valve unit is mounted on a spool rod 500 in which a driven spool 600 reciprocates, and a damping unit 900 is provided on an outer peripheral surface of the driven spool 600 and the spool rod 500.

The spool rod 500 is formed to have a stepped shape in a lower end portion of a piston rod 700 that reciprocates within a cylinder (not illustrated).

The valve unit includes a main piston 100 having a central portion through which the spool rod 500 passes. The main piston 100 partitions the cylinder into a cylinder upper chamber U and a cylinder lower chamber D. In the main piston 100, a compression passage 102 and a rebound passage 101 are alternately disposed.

The valve unit includes a compression retainer 200 disposed above the main piston 100.

The valve unit includes a rebound retainer 400 disposed under the main piston 100.

The valve unit includes a first housing 310 disposed above the compression retainer 200 to form a first pilot chamber 311 thereinside and has an opened bottom surface.

In addition, the valve unit includes a second housing 320 disposed under the rebound retainer 400 to form a second pilot chamber 322 thereinside and has an opened top surface.

The driven spool 600 reciprocates along a guide passage 510 penetrating a central portion of the spool rod 500.

In addition, the damping unit 900 is provided on the outer peripheral surface of the driven spool 600 and the spool rod 500 so as to allow a working fluid to flow to the inside and outside of the spool rod 500 through the guide passage during the compression stroke or the rebound stroke.

The damping unit 900 forms a bypass passage in an upper portion thereof during the compression stroke in a hard mode or a soft mode and forms a bypass passage in a lower portion thereof during the rebound stroke in the hard mode or the soft mode.

In addition to the above-described embodiment, the present invention can also be applied to the following various embodiments.

Generally, in the structure in which the compression retainer 200 and the rebound retainer 400 are symmetrically disposed in the upper portion and the lower portion of the main piston 100, respectively, a reverse structure is formed when the flow of the working fluid is allowed by opening the passage in the driven spool 600 in a divided manner.

That is, when the rebound side is soft, the compression side becomes hard. Therefore, the existing passage is useless.

In addition, if a flow rate of a working fluid bypassed via the driven spool 600 is increased so as to reduce a low-speed damping force, a flow force of the driven spool 600 is generated in proportion to the square of the flow rate. Thus, a damping force is abnormally increased in a high-speed section of the soft mode.

Therefore, in order to solve these problems, the bypass passage formed between the spool rod 500 and the driven spool 600 during the compression stroke or the rebound stroke in the soft mode is provided between the bypass passage formed between the spool rod 500 and the driven spool 600 during the compression stroke or the rebound stroke in the hard mode.

In addition, the bypass passage formed between the spool rod 500 and the driven spool 600 during the compression stroke in the hard mode is provided above the bypass passage formed between the spool rod 500 and the driven spool 600 during the compression stroke in the soft mode.

That is, the bypass passage formed between the spool rod 500 and the driven spool 600 during the rebound stroke in the soft mode is provided above the bypass passages formed between the spool rod 500 and the driven spool 600 during the rebound stroke in the hard mode.

It can be seen that the damping unit 900 includes a communication assembly 910 and a guide assembly 920.

The communication assembly 910 is provided in the spool rod 500 such that the first pilot chamber 311 of the first housing 310, the compression retainer 200, the main piston 100, the rebound retainer 400, and the second pilot chamber 322 of the second housing 320 from the upper side communicate with the guide passage 510.

The guide assembly 920 is provided along the outer peripheral surface of the driven spool 600 and allows the flow of the working fluid from the upper and lower sides of the driven spool 600 through the communication assembly 910 according to the compression stroke or the rebound stroke in the hard mode or the soft mode.

The communication assembly 910 includes a compression hard passage 911 that communicates with the first pilot chamber 311 and is formed perpendicular to the guide passage 510.

The communication assembly 910 includes a first inlet passage 912 that is formed perpendicular to the guide passage 510 under the compression hard passage 911 and communicates with the first pilot chamber 311 through the central passage of the compression retainer 200.

The communication assembly 910 includes a compression soft passage 913 that is formed perpendicular to the guide passage 510 under the first inlet passage 912 and communicates with the upper side of the central portion of the main piston 100.

The communication assembly 910 includes a rebound soft passage 914 that is formed perpendicular to the guide passage 510 under the compression soft passage 913 and communicates with the lower side of the central portion of the main piston 100.

The communication assembly 910 includes a second inlet passage 915 that is formed perpendicular to the guide passage 510 under the rebound soft passage 914 and communicates with the second pilot chamber 322 through the central passage of the rebound retainer 400.

In addition, the communication assembly 910 includes a rebound hard passage 916 that is formed perpendicular to the guide passage 510 under the second inlet passage 915 and communicates with the second pilot chamber 322.

Therefore, the guide assembly 920, which will be described below, allows the flow of the working fluid through the compression hard passage 911, the compression soft passage 913, the rebound soft passage 914, and the rebound hard passage 916.

Specifically, referring to FIG. 2, the guide assembly 920 includes a compression hard guide groove 921 that is recessed upwardly at a lower edge of a first large-diameter portion 621 that constitutes the driven spool 600, is formed in an upper portion of a driven body 610 having an outer diameter smaller than an inner diameter of the guide passage 510, integrates with the driven body 610, contacts and reciprocates along an inner peripheral surface of the guide passage 510.

The guide assembly 920 includes a compression soft guide groove 922 that is recessed downwardly at an upper edge of a second large-diameter portion 622 that is formed on the outer peripheral surface of the driven body 610, integrates with the driven body 610, is disposed under the first large-diameter portion 621, contacts and reciprocates along the inner peripheral surface of the guide passage 510.

The guide assembly 920 includes a rebound soft guide groove 923 that is recessed downwardly at an upper edge of a third large-diameter portion 623 that is formed on the outer peripheral surface of the driven body 610, integrates with the driven body 610, is disposed under the second large-diameter portion 622, contacts and reciprocates along the inner peripheral surface of the guide passage 510.

In addition, the guide assembly 920 includes a rebound hard guide groove 924 that is recessed upward at a lower edge of the third large-diameter portion 623.

Therefore, the communication assembly 910 allows the flow of the working fluid through the compression hard guide groove 921, the compression soft guide groove 922, the rebound soft guide groove 923, and the rebound hard guide groove 924.

A volume formed by the compression soft guide groove 922 and the rebound soft guide groove 923 is greater than a volume formed by the compression hard guide groove 921 and the rebound hard guide groove 924.

As compared with the conventional electronically controlled internal damper, the bypass flow rate is increased and the degree of freedom of reduction in the low-speed damping force in the soft mode is increased.

Figure 5:
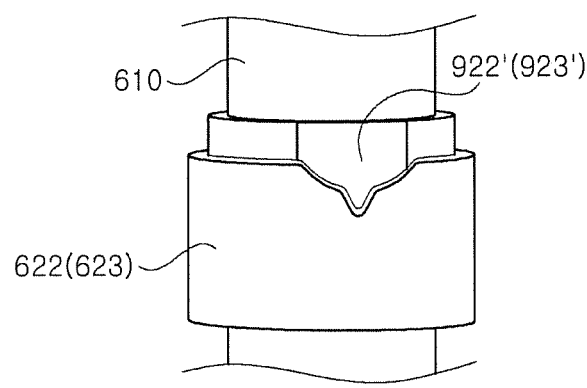
FIG. 5 is a partial enlarged perspective view of a driven spool according to another embodiment of the present invention.

In addition, as illustrated in FIG. 5, boundary lines of a compression soft guide groove 922' and a rebound soft guide groove 923' may have an approximately curly bracket "{".

In addition, a first length L1 between the compression hard guide groove 921 and the compression soft guide groove 922 may be greater than a second distance L2 between the rebound soft guide groove 923 and the rebound hard guide groove 924.

The flow of the working fluid during the rebound stroke or the compression stroke by using the electronically controlled internal damper according to the embodiment of the present invention will be described with reference to FIGS. 3 and 4.

Figure 3:
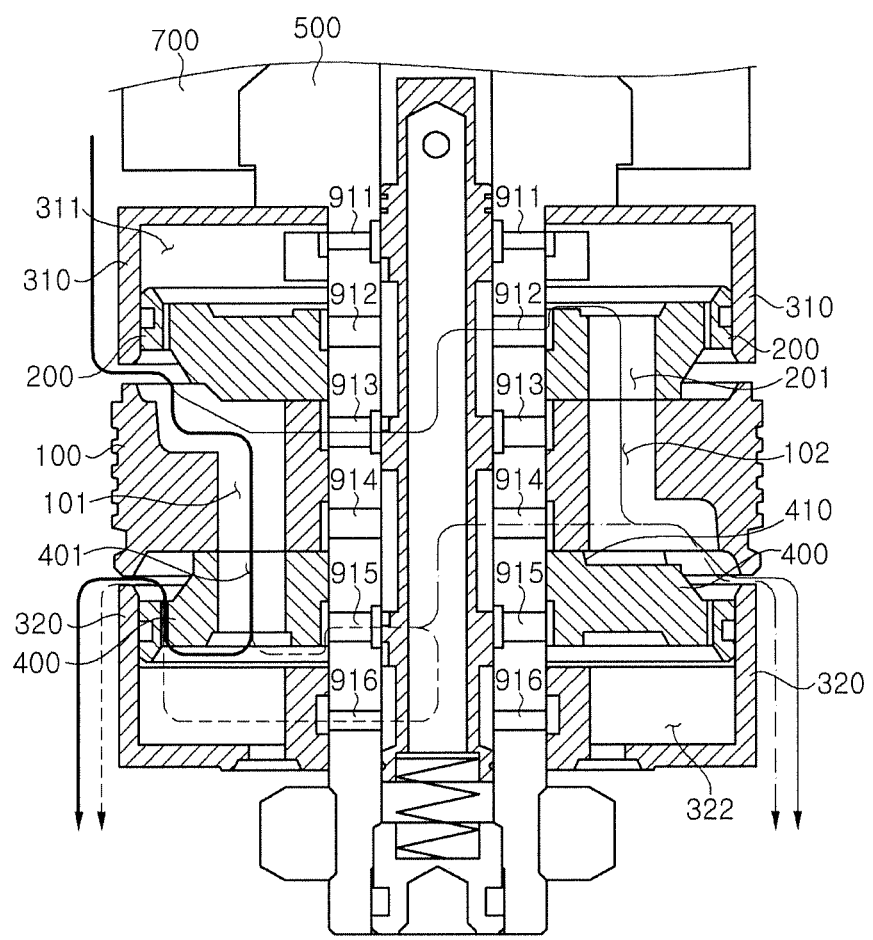
FIG. 3 is a cross-sectional conceptual diagram illustrating a flow of a working fluid during a rebound stroke of the electronically controlled internal damper according to the embodiment of the present invention.
Figure 4:
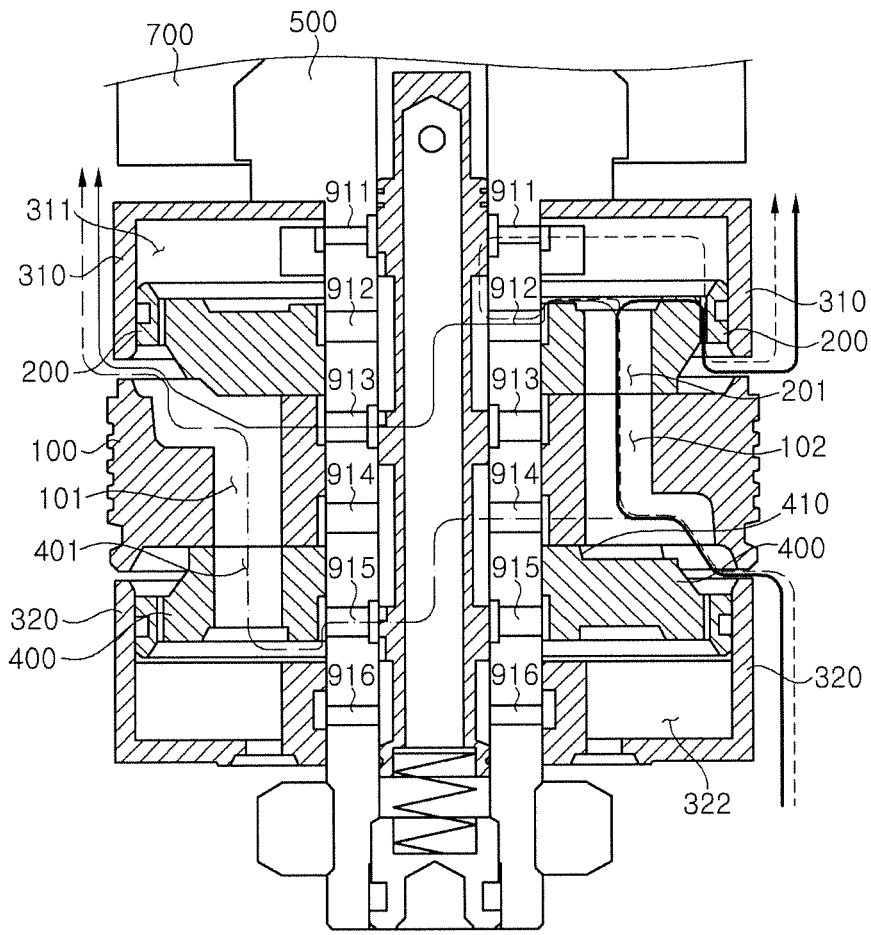
FIG. 4 is a cross-sectional conceptual diagram illustrating a flow of a working fluid during a compression stroke of the electronically controlled internal damper according to the embodiment of the present invention.

FIG. 3 is a cross-sectional conceptual diagram illustrating the flow of the working fluid during the rebound stroke of the electronically controlled internal damper according to the embodiment of the present invention, and FIG. 4 is a cross-sectional conceptual diagram illustrating the flow of the working fluid during the compression stroke of the electronically controlled internal damper according to the embodiment of the present invention.

Reference numerals that are not shown in FIGS. 3 and 4 will be referred to those of FIGS. 1 and 2.

Arrows indicated by thick solid lines in FIGS. 3 and 4 represent the main passage formed by the working fluid according to the rebound stroke and the compression stroke, respectively.

Arrows indicated by thin solid lines in FIGS. 3 and 4 represent directions in which the compression-side passage is formed in the soft mode.

Arrows indicated by dot-and-dash lines in FIGS. 3 and 4 represent directions in which the rebound-side passage is formed in the soft mode.

Arrows indicated by dashed lines in FIGS. 3 and 4 represent directions in which the passage is formed in the hard mode.

The flow rate bypassed in the soft mode or the hard mode is divided into two places and the flow force of the driven spool 600 can be reduced by the divided bypass passages.

In other words, as the flow force of the driven spool 600 is in proportion to the square of the flow rate of the working fluid flowing in the rebound stroke or the compression stroke, and a total bypassed flow rate is equal. The working fluid corresponding to ½ of the total flow rate passes through the divided bypass passages as described above, so that the flow force of the driven spool 600 is reduced by ½.

A basic technical spirit of the present invention is to provide the electronically controlled internal damper that is capable of improving ride comfort by reducing the low-speed damping force of the soft mode in the driven spool and the spool rod without increasing their sizes.

The above-described configurations according to the present invention can obtain the following effects.

Due to the structure including the damping unit that forms the bypass passage in the upper portion thereof during the compression stroke in the hard mode or the soft mode and forms the bypass passage in the lower portion thereof during the rebound stroke in the hard mode or the soft mode, it is possible to improve ride comfort by reducing the low-speed damping force of the soft mode in the driven spool and the spool rod without increasing their sizes.

Therefore, as compared with the conventional electronically controlled internal damper, the bypass flow rate is increased and the degree of freedom of reduction in the low-speed damping force in the soft mode is increased. Therefore, it is possible to provide a high-reliability product.

While the embodiments of the present invention have been described with reference to the specific embodiments, it will be apparent to those skilled in the art that various changes and modifications may be made without departing from the spirit and scope of the invention as defined in the following claims.

What is claimed is:

1. An electronically controlled internal damper comprising:
   a spool rod which is formed to have a stepped shape in a lower end portion of a piston rod that reciprocates within a cylinder;
   a valve unit including: a main piston which has a central portion through which the spool rod passes, and partitions the cylinder into a cylinder upper chamber and a cylinder lower chamber, and in which a compression passage and a rebound passage are alternately disposed; a compression retainer disposed above the main piston; a rebound retainer disposed under the main piston; a first housing which is disposed above the compression retainer to form a first pilot chamber inside the first housing and has an opened bottom surface; and a second housing which is disposed under the rebound retainer to form a second pilot chamber inside the second housing and has an opened top surface;
   a driven spool which reciprocates along a guide passage penetrating a central portion of the spool rod; and
   a damping unit which is provided on an outer peripheral surface of the driven spool and the spool rod so as to allow a working fluid to flow to the inside and outside of the spool rod through the guide passage during a compression stroke or a rebound stroke, forms a first bypass passage in an upper portion of the damping unit during the compression stroke in a hard mode or a soft mode, and forms a second bypass passage in a lower portion of the damping unit during the rebound stroke in the hard mode or the soft mode,
   wherein the damping unit includes: a communication assembly provided in the spool rod; and a guide assembly,
   wherein the communication assembly includes:
   a compression hard passage communicating with the first pilot chamber;
   a first inlet passage formed under the compression hard passage and communicating with the first pilot chamber through a central passage of the compression retainer;
   a compression soft passage formed under the first inlet passage and communicating with a central portion of the main piston;
   a rebound soft passage formed under the compression soft passage and communicating with the central portion of the main piston;
   a second inlet passage formed under the rebound soft passage and communicating with the second pilot chamber through a central passage of the rebound retainer; and
   a rebound hard passage formed under the second inlet passage and communicating with the second pilot chamber, and
   wherein the guide assembly includes:
   a first large-diameter portion formed in an upper portion of the driven spool; and
   a second large-diameter portion formed under the first large-diameter portion and having a compression soft guide groove which is recessed downwardly at an upper edge of the second large-diameter portion.

2. The electronically controlled internal damper according to claim 1, wherein the first or second bypass passage formed between the spool rod and the driven spool during the compression stroke or the rebound stroke in the soft mode is provided between the first or second bypass passage formed between the spool rod and the driven spool during the compression stroke or the rebound stroke in the hard mode.

3. The electronically controlled internal damper according to claim 1, wherein the first bypass passage formed between the spool rod and the driven spool during the compression stroke in the hard mode is provided above the first bypass passage formed between the spool rod and the driven spool during the compression stroke in the soft mode.

4. The electronically controlled internal damper according to claim 1, wherein the second bypass passage formed between the spool rod and the driven spool during the rebound stroke in the soft mode is provided above the second bypass passage formed between the spool rod and the driven spool during the rebound stroke in the hard mode.

5. The electronically controlled internal damper according to claim 1,
   wherein the first pilot chamber of the first housing, the compression retainer, the main piston, the rebound retainer, and the second pilot chamber of the second housing from the upper side communicate with the guide passage, and
   wherein the guide assembly allows a flow of the working fluid from the upper and lower sides of the driven spool through the communication assembly according to the compression stroke or the rebound stroke in the hard mode or the soft mode.

6. The electronically controlled internal damper according to claim 1, wherein the guide assembly further includes:
   a rebound soft guide groove recessed downwardly at an upper edge of a third large-diameter portion, which is formed on the outer peripheral surface of the driven body, is disposed under the second large-diameter portion, and reciprocates along an inner peripheral surface of the guide passage; and
   a rebound hard guide groove recessed upward at a lower edge of the third large-diameter portion,
   wherein the compression soft guide groove is disposed under the first large-diameter portion and reciprocates along the inner peripheral surface of the guide passage.

* * * * *